United States Patent
Palmas et al.

(10) Patent No.: US 7,026,262 B1
(45) Date of Patent: Apr. 11, 2006

(54) APPARATUS AND PROCESS FOR REGENERATING CATALYST

(75) Inventors: Paolo Palmas, Des Plaines, IL (US); David A. Lomas, Barrington, IL (US)

(73) Assignee: UOP LLC, Des Plaines, IL (US)

( * ) Notice: Subject to any disclaimer, the term of this patent is extended or adjusted under 35 U.S.C. 154(b) by 160 days.

(21) Appl. No.: 10/246,100

(22) Filed: Sep. 17, 2002

(51) Int. Cl.
*B01J 20/34* (2006.01)
*B01J 38/12* (2006.01)
*B01J 38/30* (2006.01)
*B01J 38/36* (2006.01)

(52) U.S. Cl. .......................... 502/41; 502/34; 502/38; 502/42

(58) Field of Classification Search ................ 502/34, 502/38, 41, 42
See application file for complete search history.

(56) References Cited

U.S. PATENT DOCUMENTS

| | | | |
|---|---|---|---|
| 3,844,973 A | 10/1974 | Stine et al. | 252/417 |
| 3,923,686 A | 12/1975 | Stine et al. | 252/417 |
| 3,958,953 A | 5/1976 | Luckenbach | 23/288 B |
| 4,197,189 A | 4/1980 | Thompson et al. | 208/164 |
| 4,272,402 A | 6/1981 | Mayes | 252/417 |
| 4,299,687 A | 11/1981 | Myers et al. | 208/113 |
| 4,336,160 A | 6/1982 | Dean et al. | 252/417 |
| 4,430,201 A | 2/1984 | Castagnos, Jr. et al. | 208/164 |
| 4,610,851 A | 9/1986 | Colvert et al. | 422/310 |
| 4,664,776 A | 5/1987 | Ward | 208/113 |
| 4,695,370 A | 9/1987 | Galtier et al. | 208/113 |
| 4,843,051 A | 6/1989 | Kovacs et al. | 502/42 |
| 4,849,091 A | 7/1989 | Cabrera et al. | 208/113 |
| 5,158,919 A | 10/1992 | Haddad et al. | 502/44 |
| 5,773,378 A | 6/1998 | Bussey et al. | 502/41 |
| 5,827,793 A | 10/1998 | Hu | 502/41 |
| 5,858,207 A * | 1/1999 | Lomas | 208/113 |
| 5,908,804 A * | 6/1999 | Menon et al. | 502/38 |

* cited by examiner

*Primary Examiner*—Stanley S. Silverman
*Assistant Examiner*—Jonas N. Strickland
(74) *Attorney, Agent, or Firm*—John G. Tolomei; James C. Paschall

(57) ABSTRACT

Disclosed is an apparatus and process for prolonging the residence time of catalyst in a chamber for regenerating catalyst. Spent catalyst, perhaps from an FCC reactor, is introduced into a chamber of a regeneration vessel between lower and higher combustion gas distributors. The velocity of gas from the lower distributor is insufficient to entrain catalyst from the bed, and gas from the higher distributor when combined with gas rising from the lower distributor is sufficient to generate a fast fluidized flow condition. The second distributor elevates the location of the transition from turbulent bed to fast fluidized conditions.

20 Claims, 2 Drawing Sheets

APPARATUS AND PROCESS FOR REGENERATING CATALYST

BACKGROUND OF THE INVENTION

The invention relates to a method of regenerating spent hydrocarbon conversion catalyst by the combustion of coke on the catalyst in a fluidized combustion zone. This invention specifically relates to a process for the conversion of heavy hydrocarbons into lighter hydrocarbons with a fluidized stream of catalyst particles and regeneration of the catalyst particles to remove coke that acts to deactivate the catalyst.

Fluidized catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of added hydrogen or the consumption of hydrogen. As the cracking reaction proceeds substantial amounts of highly carbonaceous material referred to as coke is deposited on the catalyst. A high temperature regeneration within a regeneration zone operation burns coke from the catalyst. Coke-containing catalyst, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone. Methods for cracking hydrocarbons in a fluidized stream of catalyst, transporting catalyst between reaction and regeneration zones, and combusting coke in the regenerator are well known by those skilled in the art of FCC processes. To this end the art is replete with vessel configurations for contacting catalyst particles with feed and regeneration gas respectively.

A common objective of these configurations is maximizing product yield from the reactor while minimizing operating and equipment costs. Optimization of feedstock conversion ordinarily requires essentially complete removal of coke from the catalyst. This essentially complete removal of coke from catalyst is often referred to as complete regeneration. Complete regeneration produces a catalyst having less than 0.1 and preferably less than 0.05 wt-% coke. In order to obtain complete regeneration, the catalyst has to be in contact with oxygen for sufficient residence time to permit thorough combustion.

Conventional regenerators typically include a vessel including a spent catalyst inlet, a regenerated catalyst outlet and a distributor for supplying air to the dense bed of catalyst that resides in the vessel. Cyclone separators remove catalyst entrained in the spent combustion gas before the gas exits the regenerator vessel. U.S. Pat. No. 4,610,851 discloses a regenerator vessel with two air distributors at different levels to assure adequate distribution of combustion gas throughout the vessel. U.S. Pat. No. 5,827,793 teaches at least two air distributors at different levels in the lower half of the dense bed of catalyst to promote a reducing environment in dense bed. U.S. Pat. No. 4,843,051 show two air distributors grids at different levels in a regeneration vessel to assure adequate combustion. U.S. Pat. No. 5,773,378 teaches a regenerator vessel with a lower air distributor and air enters above the lower air distributor with spent catalyst.

In a dense catalyst bed, also known as a bubbling bed, combustion gas forms bubbles that ascend through a discernible top surface of a dense catalyst bed. Relatively little catalyst is entrained in the combustion gas exiting the dense bed. The superficial velocity of the combustion gas is typically less than 0.3 m/s (1.0 ft/s) and the density of the dense bed is typically greater than 640 kg/m$^3$ (40 lb/ft$^3$) depending on the characteristics of the catalyst. The mixture of catalyst and combustion gas is heterogeneous with pervasive gas bypassing of catalyst.

One way to obtain fully regenerated catalyst is by performing the regeneration in stages. U.S. Pat. No. 3,958,953 describes a staged flow system having concentric catalyst beds separated by baffles which open into a common space for collecting spent regeneration gas and separating catalyst particles. U.S. Pat. No. 4,299,687 teaches the use of a staged regenerator system having superimposed catalyst beds wherein spent catalyst particles first enter an upper dense fluidized bed of catalyst and are contacted with regeneration gas from the lower catalyst bed and fresh regeneration gas. After partial regeneration in the first regeneration zone, catalyst particles are transferred by gravity flow into a lower catalyst bed to which is charged a stream of fresh regeneration gas. U.S. Pat. No. 4,695,370 and U.S. Pat. No. 4,664,778 disclose two stage regenerators in which each stage is performed in a separate vessel.

The use of relatively dilute phase regeneration zones to effect complete catalyst regeneration is shown in U.S. Pat. No. 4,430,201, U.S. Pat. No. 3,844,973 and U.S. Pat. No. 3,923,686. These patents teach a lower dense bed to which combustion gas is distributed and an upper transport zone. Additional air is distributed in a riser providing the transport zone. A two-stage system that combines a relatively dilute phase transport zone without a lower dense bed zone for regenerating catalyst is shown in U.S. Pat. No. 5,158,919 and U.S. Pat. No. 4,272,402. These patents all teach an upper dense bed into which the at least partially regenerated catalyst exiting from the transport zone collects.

Dilute or transport flow regimes are typically used in FCC riser reactors. In transport flow, the difference in the velocity of the gas and the catalyst is relatively low with little catalyst back mixing or hold up. The catalyst in the reaction zone maintains flow at a low density and very dilute phase conditions. The superficial gas velocity in transport flow is typically greater than 2.1 m/s (7.0 ft/s), and the density of the catalyst is typically no more than 48 kg/m$^3$ (3 lb/ft$^3$). The density in a transport zone in a regenerator may approach 80 kg/m$^3$ (5 lb/ft$^3$). In transport mode, the catalyst-combustion gas mixture is homogeneous without gas voids or bubbles forming in the catalyst phase.

Intermediate of dense, bubbling beds and dilute, transport flow regimes are turbulent beds and fast fluidized regimes. In a turbulent bed, the mixture of catalyst and combustion gas is not homogeneous. The turbulent bed is a dense catalyst bed with elongated voids of combustion gas forming within the catalyst phase and a less discernible surface. Entrained catalyst leaves the bed with the combustion gas, and the catalyst density is not quite proportional to its elevation within the reactor. The superficial combustion gas velocity is between about 0.3 and about 1.1 m/s (1.0 and 3.5 ft/s), and the density is typically between about 320 and about 640 kg/m$^3$ (20 and 40 lb/ft$^3$) in a turbulent bed.

Fast fluidization defines a condition of fluidized solid particles lying between the turbulent bed of particles and complete particle transport mode. A fast fluidized condition is characterized by a fluidizing gas velocity higher than that of a dense phase turbulent bed, resulting in a lower catalyst density and vigorous solid/gas contacting. In a fast fluidized zone, there is a net transport of catalyst caused by the upward flow of fluidizing gas. The catalyst density in the fast fluidized condition is much more sensitive to particle loading than in the complete particle transport mode. Therefore, it is possible to adjust catalyst residence time to achieve the desired combustion at the highly effective gas-solid, mixing conditions. From the fast fluidized mode, further increases in fluidized gas velocity will raise the rate of upward particle transport, and will sharply reduce the average catalyst density until, at sufficient gas velocity, the particles are moving principally in the complete catalyst transport mode. Thus, there is a continuum in the progression from a fluidized particle bed through fast fluidization and to the pure transport mode. The superficial combustion gas velocity for a fast fluidized flow regime is typically between about 1.1 and about 2.1 m/s (3.5 and 7 ft/s) and the density is typically between about 48 and about 320 kg/m$^3$ (3 and 20 lb/ft$^3$).

U.S. Pat. No. 4,849,091, U.S. Pat. No. 4,197,189 and U.S. Pat. No. 4,336,160 teach a riser combustion zone in which fast fluidized flow conditions are maintained. The latter of these patents teaches a combustor regenerator in which complete combustion occurs in a fast fluidized riser zone without the need for the addition of combustion gas to the bed collected from the top of the riser.

A combustor is a type of regenerator that completely regenerates catalyst in a lower combustion chamber under fast fluidized flow conditions with a relatively small amount of excess oxygen. A riser carries regenerated catalyst and spent combustion gas to a separation chamber wherein significant combustion occurs. Regenerated catalyst in the separation chamber is recycled to the lower combustion phase to heat the spent catalyst about to undergo combustion. The regenerated catalyst recycling provides heat to accelerate the combustion of the lower phase of catalyst. Combustors are advantageous because of their efficient oxygen requirements.

As greater demands are placed on FCC units, combustor vessels are being required to handle greater catalyst throughput. Greater quantities of combustion gas are added to the combustor vessels to combust greater quantities of catalyst. As combustion gas flow rates are increased, so does the flow rate of catalyst between the combustion and separation chamber increase. Hence, unless the combustion chamber of a combustor vessel is enlarged, the residence time of catalyst in the lower zone will diminish, thereby decreasing the thoroughness of the combustion that must be achieved before the catalyst enters the separation chamber.

SUMMARY OF THE INVENTION

This invention is directed to an arrangement for removing carbon deposits referred to as coke from the surface and pores of catalyst used in a hydrocarbon conversion process. Hybrid turbulent bed and fast fluidized conditions in a regeneration vessel assure adequate residence time for regenerating spent hydrocarbon cracking catalyst. The combustion chamber utilizes the hybrid conditions to completely regenerate catalyst. A separation chamber collects a dense bed of completely regenerated catalyst. The invention may be used to increase combustion gas throughput to accommodate a correspondingly increased throughput of catalyst while still keeping the combustion gas and catalyst in contact for sufficient residence time.

DETAILED DESCRIPTION OF THE INVENTION

Figure 1:
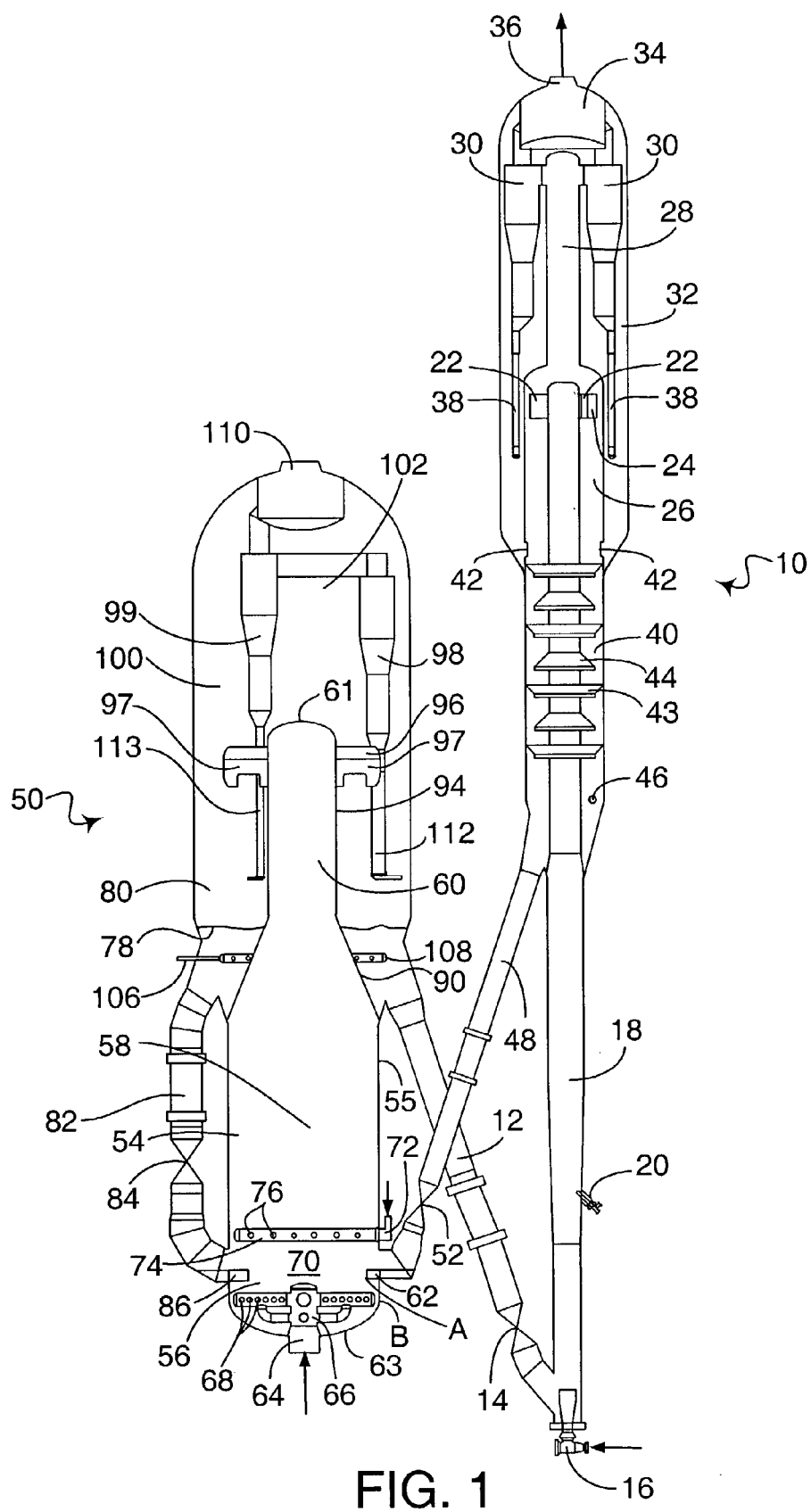
FIG. 1 is a schematic, elevational view of an FCC unit incorporating the present invention.

The process and apparatus of the present invention may be embodied in an FCC unit. FIG. 1 shows an FCC unit that includes a reactor vessel 10 and a combustor vessel 50. A combustor standpipe 12 transfers catalyst from the combustor vessel 50 at a rate regulated by a slide valve 14 to the reactor vessel 10. A fluidization medium such as steam from a nozzle 16 transports catalyst upwardly through a riser 18 at a relatively high density until a plurality of feed injection nozzles 20 (only one is shown) inject feed across the flowing stream of catalyst particles. The resulting mixture continues upwardly through the riser 18 until a pair of disengaging arms 22 tangentially discharge the mixture of gas and catalyst from a top of the riser 18 through ports 24 into a disengaging vessel 26 that effects separation of gases from the catalyst. A transport conduit 28 carries the hydrocarbon vapors, including stripped hydrocarbons, stripping media and entrained catalyst to one or more cyclones 30 in a separator vessel 32 which separates spent catalyst from the hydrocarbon vapor stream. A collection chamber 34 in the separator vessel 32 gathers the separated hydrocarbon vapor streams from the cyclones 30 for passage to an outlet nozzle 36 and eventually into a fractionation recovery zone (not shown). Diplegs 38 discharge catalyst from the cyclones 30 into a lower portion of the separator vessel 32 that eventually passes the catalyst and adsorbed or entrained hydrocarbons into a stripping section 40 across ports 42 defined in a wall of the disengaging vessel 26. Catalyst separated in the disengaging vessel 26 passes directly into the stripping section 40. The stripping section 40 contains baffles 43, 44 to promote mixing between a stripping gas and the catalyst. The stripping gas enters a lower portion of the stripping section 40 through at least one inlet 46 to one or more distributors (not shown). The spent catalyst leaves the stripping section 40 through a reactor conduit 48 and passes into the combustor vessel 50 at a rate regulated by a slide valve 52.

The combustor vessel 50 utilizes hybrid turbulent bed-fast fluidized conditions in a high-efficiency combustor chamber 54 for completely regenerating spent catalyst. The combustor chamber 54 of the combustor vessel 50 includes three combustion zones: a turbulent zone 56, a fast fluidized zone 58 and a transport zone 60. The reactor conduit 48 feeds spent catalyst to the combustor chamber 54 through a spent catalyst inlet chute 62 at an entry point "A". An elliptical base 63 of the combustor chamber 54 defines a cross-sectional area at an intersection "B" with a side wall 55 of the combustor chamber 54 below the spent catalyst inlet chute 62. The spent catalyst from the reactor vessel 10 usually contains carbon in an amount of from 0.2 to 2 wt-%, which is present in the form of coke. Although coke is primarily composed of carbon, it may contain from 3 to 12 wt-% hydrogen as well as sulfur and other materials. An oxygen-containing combustion gas, typically air, enters the combustor chamber 54 of the combustor vessel 50 at two elevations. A first stream of combustion gas enters the combustor chamber 54 at a low elevation through a low conduit 64 and is distributed across the turbulent zone 56 by a low distributor 66. Openings 68 in the low distributor 66 emit combustion gas at a vertical elevation that is lower than the entry point "A" of spent catalyst into the combustor chamber 54. As the combustion gas enters the combustion zone, it contacts spent catalyst that accumulates in a turbulent catalyst bed 70 in the turbulent zone 56. The combustion gas is distributed from the low distributor 66 to provide a superficial gas velocity of less than 1.1 m/s (3.5 ft/s) which is insufficient to destroy the turbulent catalyst bed 70 in the turbulent zone 56. In other words, the gas velocity from low distributor 66 will be insufficient to entrain catalyst and remove catalyst from the bed, thereby preserving the catalyst bed 70. The turbulent zone 56 will have a catalyst density of from about 320 to 640 kg/m$^3$ (20 to 40 lb/ft$^3$).

A second stream of combustion gas enters the fast fluidized zone 58 of the combustor chamber 54 through a high conduit 72 and is distributed across the combustor chamber 54 by a high distributor 74. Openings 76 in the high distributor 74 emit combustion gas at a vertical elevation that is higher than the entry point "A" of spent catalyst into the combustor vessel 50 through the spent catalyst inlet chute 62 and higher than the entry point of the first stream of combustion gas through the low distributor 66. Hence, in an embodiment, the entry point "A" is vertically between the high distributor 74 and the low distributor 66. In another embodiment, less combustion gas is distributed to the fast fluidized zone 58 of the combustor chamber 54 through the high distributor 74 than through the low distributor 66. However, when the flow rate of combustion gas from the low distributor 66 is combined with the flow rate of combustion gas from the high distributor 74, the superficial velocity of the total combustion gas in the combustor chamber 54 attains at least 1.1 m/s (3.5 ft/s) to enter the fast fluidized zone 58 under fast fluidized flow conditions. In an embodiment, the fast fluidized zone 58 will have a catalyst density of from 48 to 320 kg/m$^3$ (3 to 20 lb/ft$^3$) and a superficial gas velocity of 1.1 to 2.2 m/s (3.5 to 7 ft/s). A gradual transition from the turbulent zone 56 to the fast fluidized zone 58 is provided above the openings 76. In the fast fluidized zone 58, the density of catalyst will diminish proportionately with height.

The transition from a turbulent bed to a fluidized flow regime is not delineated by a discernible bed surface. Hence, a continuum of diminishing catalyst density will extend from the turbulent bed 70 upwardly in the combustor chamber 54. The rate at which catalyst density diminishes with the height of the combustor chamber 54 will decrease proportionately to the rate at which catalyst is delivered to the combustor chamber 54.

In an embodiment, to accelerate combustion of the coke in the combustor chamber 54, hot regenerated catalyst from a dense catalyst bed 78 in an upper chamber 80 may be recirculated into the combustor chamber 54 via an extended recycle standpipe 82 regulated by a control valve 84. Hot regenerated catalyst enters the combustor chamber 54 through an inlet chute 86. Recirculation of regenerated catalyst, by mixing hot catalyst from the dense catalyst bed 78 with relatively cold spent catalyst from the reactor conduit 48 entering the combustor chamber 54, raises the overall temperature of the catalyst and gas mixture in the turbulent zone 56. Aside from using the extended recycle standpipe 82, several other methods of effecting catalyst recirculation may be used. For example, catalyst may be transferred internally by an internal standpipe (not shown). The height of the particle loading in the combustor chamber 54 may be adjusted by increasing the recycle flow rate of catalyst through the control valve 84 without affecting the flow rate of spent catalyst through the slide valve 52. The regenerated catalyst may enter through the inlet chute 86 at the same elevation as the entry point "A" of spent catalyst through the spent catalyst inlet chute 62. However, in an embodiment, the regenerated catalyst enters the combustor chamber 54 between the low distributor 66 and the high distributor 74 to have a greater heat exchange opportunity in the turbulent bed 70.

By distributing the combustion gas at two elevations, above and below the entry point "A" of catalyst, more combustion gas can be added to the catalyst in the combustor chamber 54 without immediately forming fast fluidized flow conditions in the combustor chamber 54 and destroying the turbulent bed 70. Hence, a transition between the turbulent zone 56 and the fast fluidized zone 58 can be extended to near, at or above the high distributor 74. Spent catalyst is in contact with the combustion gas for a longer residence time in the combustor chamber 54. Moreover, if all of the combustion gas is introduced above the entry point "A" of spent catalyst, much of the spent catalyst in the turbulent bed 70 would undergo fluidization only after long delay and stagnation.

The catalyst and gas mixture in the fast fluidized zone 58 ascend through a frustoconical transition section 90 to the transport zone 60 in a riser section 94 of the combustor chamber 54, which is operated at a higher superficial gas velocity than in the fast fluidized zone 58 or in the turbulent zone 56 below the transition section 90. The increased gas velocity is due to the reduced cross-sectional area of the riser section 94 relative to the cross-sectional area of the combustor chamber 54 below the transition section 90. A cross-sectional area of the riser section 94 is smaller than the cross-sectional area of the combustor chamber 54 below the spent catalyst inlet chute 62 at the intersection "B" to assure increased superficial velocity. Hence, the superficial gas velocity will usually exceed about 2.2 m/s (7 ft/s). The transport zone 60 will have lower catalyst densities of less than about 80 kg/m$^3$ (5 lb/ft$^3$).

The combustor vessel 50 also includes a superjacent separation chamber 100. The mixture of catalyst particles and combustion gas, which is spent due to oxygen consumption, is discharged from an upper portion of the riser section 94 into the separation chamber 100. Substantially completely regenerated catalyst exits the top of the transport zone 60. Discharge is effected through a disengaging device 96 that separates a majority of the regenerated catalyst from the spent regeneration gas. Initial separation of catalyst upon exiting the riser section 94 minimizes the catalyst loading on cyclone separators 98, 99 or other downstream devices used for the essentially complete removal of catalyst particles from the spent regeneration gas, thereby reducing overall equipment costs. Various flow devices known to those skilled in the art will perform the preliminary catalyst and gas separation which would be suitable for use as the disengaging device 96. In an embodiment, catalyst and gas flowing up the riser section 94 impact a top elliptical cap 61 of the riser section 94 and reverse flow. The catalyst and gas then exit through downwardly directed openings in lateral arms 97 of the disengaging device 96. The sudden loss of momentum and downward flow reversal cause at least 70 and preferably 80 wt-% of the heavier catalyst to fall to the dense catalyst bed 78 and the lighter combustion gas and a minor portion of the catalyst still entrained therein to ascend upwardly to a disengaging space 102 of the separation chamber 100.

Downwardly falling disengaged catalyst collects in the dense catalyst bed 78. Catalyst densities in the dense catalyst bed 78 are typically kept within a range of from about 640 to about 960 kg/m$^3$ (40 to 60 lb/ft$^3$). A fluidizing conduit 106 delivers fluidizing gas, typically air, to the dense catalyst bed 78 through a fluidizing distributor 108. Approximately no more than 2% of the total gas requirements within the process enters the dense catalyst bed 78 through the fluidizing distributor 108. Gas is added here not for combustion purposes but only for fluidizing purposes so the catalyst will fluidly exit through the standpipes 82 and 12. The fluidizing gas added through the fluidizing distributor 108 may be combustion gas.

The combined combustion and fluidizing gas and entrained particles of catalyst enter one or more separation means, such as the cyclone separators 98, 99, which separates catalyst fines from the gas. Spent combustion gas, relatively free of catalyst is withdrawn from the combustor vessel 50 through an exit conduit 110 while recovered catalyst is returned to the dense catalyst bed 78 through respective diplegs 112, 113 or other comparable means. From about 10 to 30 wt-% of the catalyst discharged from the combustor chamber 54 is present in the gases above the exit from the transport zone 60 and enter the cyclone separators 98, 99. Catalyst from the dense catalyst bed 78 is transferred through the combustor standpipe 12 back to the reactor vessel 10 where it again contacts feed as the FCC process continues.

The combustor chamber 54 provides regions of lower catalyst density and prolonged periods of vigorous mixing which are believed to be the most efficient for coke combustion and characterize a high efficiency regeneration. Therefore, the addition of combustor gas at conditions to promote high efficiency regeneration is sufficient to remove all of the coke from the entering spent catalyst in the combustor chamber 54. The combustion gas may be delivered to the conduits 64, 72 and 106 by the same line, but in an embodiment, the feed rate to the low conduit 64 should be greater than to the high conduit 72.

Thus, an FCC reaction zone associated with this invention can be used to process a conventional FCC feedstock or higher boiling hydrocarbon feeds. The most common of such conventional feedstocks is a "vacuum gas oil" (VGO), which is typically a hydrocarbon material having a boiling range of from 343° to 552° C. (650° to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons. However, the foregoing list is not intended to exclude the application of this process to other suitable feeds. The heavy hydrocarbon fractions are also characterized by the presence of significant metal contamination. These metals accumulate on the catalyst and poison the catalyst by blocking reaction sites and promote overcracking thereby interfering with the reaction process. Therefore, the use of passivation or other metals management procedures within or before the reaction zone are anticipated when processing heavy feedstocks by this invention.

Therefore, one advantage of the present invention is that it allows the regeneration of greater quantities of spent catalyst by exposing it to a proportionally greater combustion gas without blowing the catalyst out of the regeneration zone before regeneration is complete. With regard to oxygen or air requirements, the combustor vessel of the present invention may typically require 14 kg of air per kg of coke removed to obtain complete regeneration. When more catalyst is regenerated, greater amounts of feed may be processed in a conventional reaction vessel.

Figure 2:
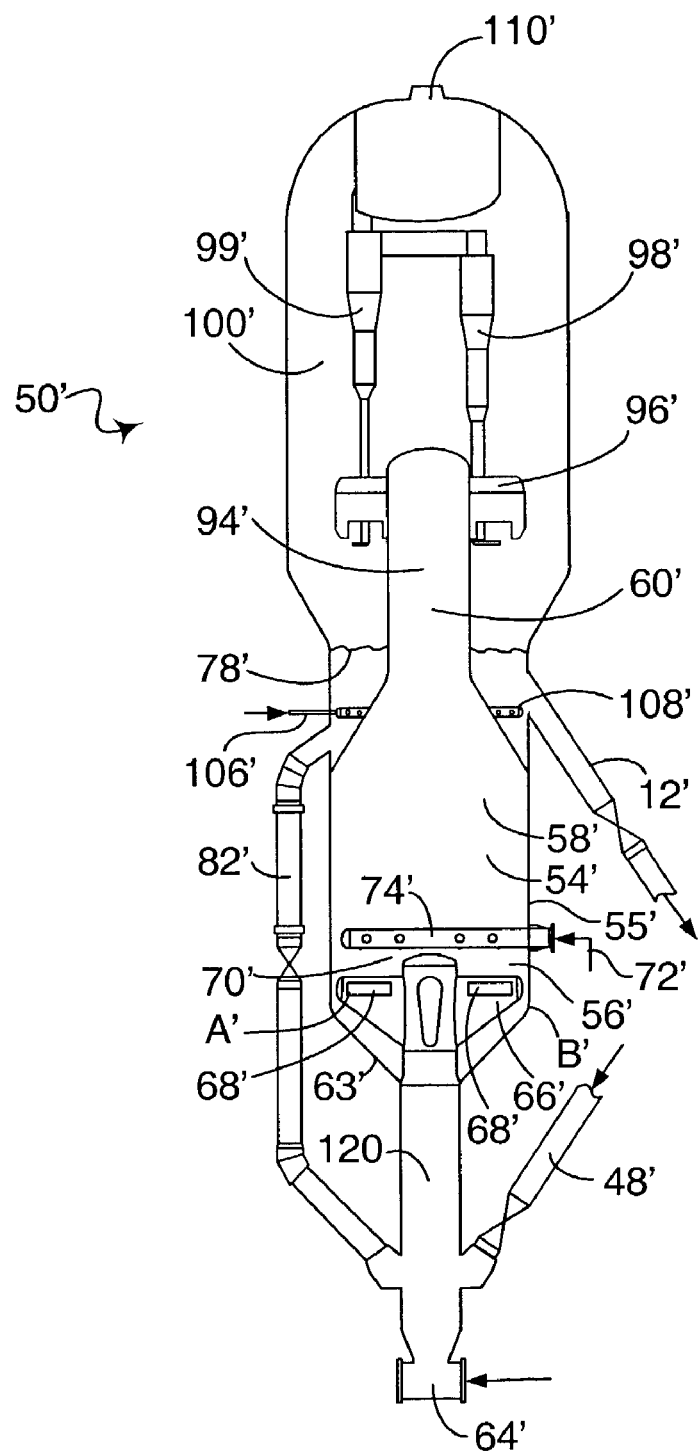
FIG. 2 is a schematic, elevational view of an alternative embodiment of the present invention.

Another embodiment of this invention is illustrated in FIG. 2 which depicts a somewhat modified combustor vessel 50'. Reference numerals for similar elements in FIG. 2 that are also in FIG. 1, but are different will be designated with a prime symbol ("'"). Identical elements in both FIGS. 1 and 2 will be designated with the same reference numeral. The combustor vessel 50' has a lower mixing riser 120 for combining spent catalyst, regenerated catalyst and regeneration gas. Hot regenerated catalyst transported down an extended recycle standpipe 82' meets spent catalyst entering the lower mixing riser 120 through a reactor conduit 48'. Spent and regenerated catalyst are contacted with at least a portion of a first stream of oxygen containing combustion gas from a low conduit 64' at a lower portion of the lower mixing riser 120. A frustoconical base 63' of a combustor chamber 54' defines a cross-sectional area at an intersection "B'" with a side wall 55' of the combustor chamber 54' below openings 68' where catalyst enters the combustor chamber 54' at an entry point "A'". A cross-sectional area of a riser section 94' is smaller than the cross-sectional area of the combustor chamber 54' below the openings 68' to assure increased superficial velocity through the riser section 94'. Moreover, the lower mixing riser 120 has a cross-sectional area that is smaller than the cross-sectional area of the combustor chamber 54' below the openings 68' to promote intimate mixing of the catalyst particles and gas stream. The lower mixing riser 120 has a cross-sectional area that is also smaller than the cross-sectional area of the riser section 94'. After mixing, the catalyst and gas mixture enter a turbulent zone 56' of the combustor chamber 54' through the openings 68' in a low distributor 66'. The flow rate of combustion gas from the low conduit 64' is insufficient to generate a superficial velocity in the combustor chamber 54' that would promote a fast fluidized condition. Hence, a turbulent bed 70' is provided in the turbulent zone 56' in the combustor chamber 54'. Additional combustion gas from a high conduit 72' is added by a high distributor 74' which when aggregated with combustion gas from the low distributor 66' generates fast fluidized flow conditions in a fast fluidized zone 58'. Catalyst and combustion gas ascend to a transport zone 60', exit through a disengaging device 96' into a separation chamber 100' to separate catalyst falling into a dense catalyst bed 78' from ascending spent combustion gas. Spent combustion gas ascends to cyclone separators 98', 99' which separate additional entrained catalyst and exits through an exit conduit 110'. A fluidizing conduit 106' delivers gas which may be combustion gas to the dense catalyst bed 78' through a fluidizing distributor 108' to fluidize the catalyst in the dense catalyst bed 78'. A portion of the regenerated catalyst may be returned to the combustor chamber 54' through the extended recycle standpipe 82' and the lower mixing riser 120 to heat the spent catalyst in the turbulent bed 70', and the remaining portion of regenerated catalyst is returned to the reactor vessel 10 of FIG. 1 through a combustor standpipe 12' to be contacted with fresh feed. All other aspects of the combustor vessel 50' with the lower mixing riser 120 are similar to the combustor vessel 50 of FIG. 1. The operation of a mixing riser is more fully described in U.S. Pat. No. 4,340,566 which is incorporated herein by reference.

FIGS. 1 and 2 show a symmetrical configuration of the regeneration zones with the separation chamber 100, 100' located above in the combustor chamber 54, 54'. However, the turbulent zone 56, 56', the fast fluidized zone 58, 58' and the transport zone 60, 60' may be contained in a separate combustor vessel or located adjacent to a vessel containing the separation chamber 100, 100'. Catalyst in this embodiment is transferred from the combustor vessel to a separator vessel by means of a conduit. Thus, the utilization of this invention is not limited to a symmetrical regenerator configuration but may be a modified dense bed regenerator vessel.

What is claimed is:

1. A process for the combustion of carbonaceous deposits from catalyst comprising:
    introducing spent catalyst to a first chamber through a spent catalyst inlet;
    distributing combustion gas to said first chamber below said spent catalyst inlet at a rate that will preserve a bed of catalyst;
    distributing combustion gas to said first chamber above said spent catalyst inlet at a rate that when combined with the combustion gas distributed below said spent catalyst inlet will entrain catalyst in the combustion gas, wherein more combustion gas is distributed below said spent catalyst inlet than above said spent catalyst inlet;
    lifting the catalyst entrained in the combustion gas out an exit in said first chamber and into a second chamber;
    separating said catalyst from said combustion gas;
    collecting catalyst in a bed in said second chamber;
    removing said catalyst from said second chamber; and
    recovering combustion gas from said second chamber.

2. The process of claim 1 further including recycling catalyst from said second chamber to said first chamber.

3. The process of claim 1 wherein entrained catalyst and combustion gas exit said first chamber through a riser.

4. The process of claim 3 further including introducing entrained catalyst and combustion gas to said second chamber through a device for initially separating catalyst from combustion gas.

5. The process of claim 1 further including accumulating catalyst in a second bed in said second chamber.

6. The process of claim 1 further including mixing catalyst and combustion gas together and distributing them into said first chamber through said first combustion gas distributor.

7. The process of claim 1 incorporated into an FCC process.

8. A process for the combustion of carbonaceous deposits from catalyst comprising:
    introducing spent catalyst to a first chamber through a spent catalyst inlet;
    distributing combustion gas to said first chamber below said spent catalyst inlet so as to provide a superficial velocity of less than about 1.1 m/s (3.5 ft/s);
    distributing combustion gas to said first chamber above said spent catalyst inlet so as to provide a superficial velocity of at least about 1.1 m/s when combined with the combustion gas distributed below said spent catalyst inlet, wherein more combustion gas is distributed below said spent catalyst inlet than above said spent catalyst inlet;
    lifting catalyst and combustion gas out an exit in said first chamber and into a second chamber;
    separating said catalyst from said combustion gas;
    removing said catalyst from said second chamber; and
    recovering combustion gas from said second chamber.

9. The process of claim 8 further including recycling catalyst from said second chamber to said first chamber.

10. The process of claim 8 wherein entrained catalyst and combustion gas exit said first chamber through a riser.

11. The process of claim 10 further including introducing entrained catalyst and combustion gas to said second chamber through a device for initially separating catalyst from combustion gas.

12. The process of claim 8 further including accumulating catalyst in a second bed in said second chamber.

13. The process of claim 8 further including mixing catalyst and combustion gas together and distributing them into said first chamber through said first combustion gas distributor.

14. The process of claim 8 incorporated into an FCC process.

15. A process for the combustion of carbonaceous deposits from catalyst comprising:
    introducing spent catalyst to a first chamber through a spent catalyst inlet;
    distributing combustion gas to said first chamber below said spent catalyst inlet at a rate that will preserve a bed of catalyst;
    distributing combustion gas to said first chamber above said spent catalyst inlet at a rate that when combined with the combustion gas distributed below said spent catalyst inlet will entrain catalyst in the combustion gas, wherein more combustion gas is distributed below said spent catalyst inlet than above said spent catalyst inlet;
    lifting the catalyst entrained in the combustion gas out an exit in said first chamber and into a second chamber containing a separator;
    separating said catalyst from said combustion gas;
    removing said catalyst from said second chamber; and
    recovering combustion gas from said second chamber.

16. The process of claim 15 further including recycling catalyst from said second chamber to said first chamber.

17. The process of claim 15 wherein entrained catalyst and combustion gas exit said first chamber through a riser.

18. The process of claim 15 further including introducing entrained catalyst and combustion gas to said second chamber through a device for initially separating catalyst from combustion gas.

19. The process of claim 15 further including accumulating catalyst in a second bed in said second chamber.

20. The process of claim 15 further including mixing catalyst and combustion gas together and distributing them into said first chamber through said first combustion gas distributor.

* * * * *